(12) United States Patent
Zöllner et al.

(10) Patent No.: US 10,316,117 B2
(45) Date of Patent: Jun. 11, 2019

(54) PROCESS FOR PRODUCING SHORT-CHAIN END-GROUP-FUNCTIONALIZED MACROMOLECULES BASED ON STYRENE

(71) Applicant: TESA SE, Norderstedt (DE)

(72) Inventors: Stephan Zöllner, Buchholz/Nordheide (DE); Alexander Prenzel, Hamburg (DE); Bernd Lühmann, Norderstedt (DE); Benjamin Pütz, Hamburg (DE); Helmut Ritter, Woppertal (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/104,288

(22) PCT Filed: Nov. 19, 2014

(86) PCT No.: PCT/EP2014/075015
§ 371 (c)(1),
(2) Date: Jun. 14, 2016

(87) PCT Pub. No.: WO2015/090818
PCT Pub. Date: Jun. 25, 2015

(65) Prior Publication Data
US 2016/0311942 A1    Oct. 27, 2016

(30) Foreign Application Priority Data
Dec. 18, 2013  (DE) .......... 10 2013 226 502

(51) Int. Cl.
| | | |
|---|---|---|
| *C08F 12/08* | (2006.01) | |
| *C08F 2/38* | (2006.01) | |
| *C08G 18/62* | (2006.01) | |
| *C08G 18/81* | (2006.01) | |
| *C08F 8/00* | (2006.01) | |
| *C08F 8/14* | (2006.01) | |

(52) U.S. Cl.
CPC .......... *C08F 12/08* (2013.01); *C08F 8/00* (2013.01); *C08F 8/14* (2013.01); *C08G 18/62* (2013.01); *C08G 18/8116* (2013.01); *C08F 2/38* (2013.01); *C08F 2400/02* (2013.01); *C08F 2810/30* (2013.01); *C08F 2810/40* (2013.01)

(58) Field of Classification Search
None
See application file for complete search history.

(56) References Cited

U.S. PATENT DOCUMENTS

| | | |
|---|---|---|
| 3,842,059 A | 10/1974 | Milkovich et al. |
| 4,042,768 A | 8/1977 | Muller et al. |
| 4,513,105 A | 4/1985 | Hahn et al. |
| 6,388,026 B1 | 5/2002 | Campbell et al. |

FOREIGN PATENT DOCUMENTS

| | | |
|---|---|---|
| DE | 24 39 341 A1 | 2/1976 |
| DE | 32 34 660 A1 | 3/1984 |
| DE | 698 12 638 T2 | 3/2004 |
| JP | 5 805 9202 A | 4/1983 |
| JP | 58059202 A * | 4/1983 |
| JP | S 61 64705 A | 4/1986 |
| JP | 62212403 A * | 9/1987 |
| JP | S 62 212403 A | 9/1987 |
| JP | S 63 83107 A | 4/1988 |
| JP | 01294722 A * | 11/1989 |
| JP | H01294722 A | 11/1989 |

OTHER PUBLICATIONS

International Search Report dated Jan. 14, 2015.
English Translation of International Search Report dated Jan. 14, 2015.
German Search Report dated Aug. 27, 2014.
English Translation Japanese Office Action corresponds to Japanese Application No. 2016-541320, dated Feb. 2, 2018.

* cited by examiner

*Primary Examiner* — Richard A Huhn
(74) *Attorney, Agent, or Firm* — Norris McLaughlin, P.A.

(57) ABSTRACT

End-group-functionalized oligomers with controlled degrees of functionality based on styrene are produced by reacting the monomer with a regulator by means of free-radical polymerization. At least some of the quantity of regulator is added according to a prescribed program so that at every juncture t the value of the quantitative fraction added up to said juncture does not fall short of the value of the respective conversion U(t) in the polymerization reaction at said juncture t by more than 5 percentage points and does not exceed said value U(t) by more than 5 percentage points.

19 Claims, No Drawings

PROCESS FOR PRODUCING SHORT-CHAIN END-GROUP-FUNCTIONALIZED MACROMOLECULES BASED ON STYRENE

This is a 371 of PCT/EP2014/075015 filed 19 Nov. 2014, which claims foreign priority benefit under 35 U.S.C. 119 of German Patent Application 10 2013 226 502.6 filed Dec. 18, 2013, the entire contents of which are incorporated herein by reference.

The invention relates to a process for producing end-group-functionalized short-chain macromolecules based on styrene. The macromolecules have functional groups capable of addition or substitution at one chain end.

In the chemical industry there exists an increasing interest in end-group-functionalized macromolecules with controlled degrees of functionality, i.e. having as far as possible an identical number of corresponding functions per macromolecule. Such macromolecules may be used to form higher polymers for example, but are also useful for numerous further reactions.

One method for forming high molecular weight polymer systems is the use of end-group-functionalized macromolecules. Such end-group-functionalized short-chain macromolecules are therefore also referred to as prepolymers. Macromolecules used as prepolymers are frequently in the molar mass range of 500 to ca. 100 000 g/mol, particularly in the range of 1000 to 20 000 g/mol. These prepolymers can therefore be applied to numerous different molecular weight-increasing reactions.

End-group-functionalized macromolecules may be generated by suitable production and polymerization processes. However, it is often difficult to produce macromolecules having copolymerizable terminal groups in polymerization reactions since the copolymerizable group itself already tends to participate in the polymerization reaction. Thus, a route can be taken where a poorly or non-copolymerizable terminal functional group of the macromolecules can be converted into an end group capable of polymerization, particularly a free-radical polymerization, only by a modification downstream of the polymerization, in order to obtain macromolecules. Prepolymers can then be used, for example, to form block copolymers by means of the terminal functional group, or comb copolymers can be synthesized by free-radical copolymerization of macromolecules with further free-radical polymerizable monomers for example.

So-called "living" polymerization, such as anionic polymerization, is suitable particularly for the formation of those polymers having defined molecular weight and end-group functionalization. U.S. Pat. No. 3,842,059 teaches the production of macromolecules of vinyl aromatic compounds having narrow molar mass distribution and a functional or polymerizable end group only on one chain end. Anionic polymerization, however, is less used in industry. The reasons for this are the costs and the complex reaction of the process. Anionic polymerizable monomers and the initiators required for the reaction are usually more expensive than monomers and initiators for a free-radical polymerization. Anionic polymerization requires organic solvents which are expensive and harmful to health and the environment. Anionic polymerization, due to the growing macroanion, is also sensitive to proton-donating impurities. Chain-terminating compounds must be rigorously excluded which, however, is difficult to achieve in industrial reactors.

A much more cost-effective and rapidly viable method is free-radical polymerization. Industrially it has an overriding position since it is largely insensitive to impurities and many monomers are amenable to free-radical polymerization.

End-group functionalization of polymers by means of free-radical polymerization is possible by using functional polymerization regulators. Suitable for this purpose are, inter alia, haloalkanes or organic thiols, which bear another functional group in addition to the regulating group. The desired end group can thus be introduced to the polymer by choosing the appropriate regulator. Due to their high transfer tendency in free-radical polymerization, preference is given to using functional organic thiols.

Polymerization regulators (also referred to simply as "regulators" in the context of this document) are those compounds which are able to assume the free-radical functionality of the ends of the growing macromolecules and then to themselves begin the growth of a new macromolecule. The growth of the macromolecule whose free-radical functionality has been adopted is thereby terminated. The regulators are thus capable of limiting the degree of polymerization of the evolving macromolecule without substantially influencing the reaction kinetics. The tendency to transfer the free-radical function onto the polymerization regulator is specified by the transfer constant (CO (cf. for example: J. Brandrup, E. H. Immergut, Polymer Handbook, 4th. Ed., pages 11/97 to 11/98).

Functional thiols are used especially in the production of end-group-functionalized macromolecules based on (meth) acrylic esters. This method is described for example by Boutevin (Polymer Bulletin 45, 487-494 (2001)). Functional thiols can be used particularly well here, since these have a transfer constant of $C_{tr}<1$ in the free-radical polymerization of (meth)acrylic esters. It is thereby ensured that up to a complete conversion of the monomers to transfer reactions can occur since the thiol is not completely consumed during the polymerization.

The use of thiols in the free-radical polymerization of vinyl aromatic compounds is however only possible with limitations. Due to the electron-rich double bond of the monomers, the transfer constant assumes values of well over 5. Due to the high transfer constants, the thiol is already consumed at low conversions of the monomers. In the prior art, for instance, processes are described by H. M. Jeong et. al. (T. O. Ahn, Y. C. Ha, M.-H. Oh, S.-S. Lee, S. W. Lee, H. M. Jeong, *J. Macromol. Sci., Phys.* 1995, 834, 215-229) and K. Kaeriyama (*Nippon Kagaku Zasshi* 1967, 88, 783-786) in which an end-group-functionalization of polystyrene with functional thiols can be achieved with yields of only 10 to 20%. Due to the rapid consumption, metering in of the thiol is required. Processes using metering in are taught in the patents JP63083107A and JP61064705A. Patent JP63083107A describes a process for producing carboxyl-terminated polystyrene. The polymerization is carried out in bulk without further addition of solvents. To initiate the reaction initiators are used, namely peroxides, which bear carboxyl groups. During the reaction, both initiator and carboxyl-functionalized thiol regulator are added continuously. By means of this process, prepolymers having a functionality of 1.12 and 1.62 are achievable, wherein the functionality becomes greater with increasing molar masses. The yields of prepolymers in this case, however, are only around 50%.

JP61064705A describes on the other hand a process for producing styrene prepolymers in which polymerization is started by using non-functional azo initiators. Functional thiols are then added at a constant rate over the reaction time. In this process, polymers having a number-average molar mass of 1000-20 000 g/mol can be produced. The dispersity of the molar masses ($M_w/M_n$) is specified here as 1.5 to 4. A degree of functionalization is not stated.

In particular, the degree of functionalization and also the number-average molar mass and the molar mass distribution are important characteristics in terms of a qualitative evaluation of the macromolecules, particularly with regard to their suitability as prepolymers.

The degree of functionalization reflects the "purity" of the prepolymers. If the macromolecule bears exactly one functional end group, this corresponds to an ideal degree of functionalization of 1. Accordingly, the value is 0 or 2 if one functional group is present on neither or on both chain ends respectively. Due to termination reactions, especially the combination termination of two chains, a degree of functionalization of 1 by means of free-radical polymerization is rarely feasible.

The molar mass of the prepolymers especially influences the reactivity and the physical properties. If the average molar mass (number-average) of the prepolymers is less than around 1000 g/mol, the blocks for use in block copolymers are too short such that desired physical properties such as microphase separation could be manifested. If the number-average molecular weight is higher than around 20 000 g/mol, the reactivity of the end group decreases with increasing molar mass, since the functional chain end is sterically protected by an enhanced coiling of the prepolymers.

With respect to the molar mass distribution, polymers obtained by a free-radical polymerization process generally show polydispersities of the molar masses which are significantly greater than the polymers produced in living polymerizations. With such wide molar mass distributions from very short-chain up to long-chain macromolecules, molecules of many different chain lengths are present in the polymer. This has a major influence with respect to the properties of the resulting end-group-functional prepolymers described above. A number-average molar mass of 1000 g/mol to 20 000 g/mol with as narrow a distribution of the molar masses as possible is therefore desirable.

The manufacturing processes by means of free-radical polymerization for producing macromolecular vinyl aromatic compounds having a functional group at the end of the chain, as can be found in the prior art, show many disadvantages with respect to conversion, functionality and polydispersity of the molar masses. Whereas in some processes conversions of less than 20% of the monomers are achievable, in other processes the degrees of functionalization of the prepolymers are much greater than 1.

Object

It is an object of the invention to provide an industrially cost-effective process for producing macromolecules having terminal functionalization. Advantageously, the production process should have a low reaction time. It is desirable that the degree of functionalization of the macromonomer, that is the number of functional groups per macromolecule, is as close to 1 as possible. The resulting macromolecules should very preferably have a narrow size distribution.

Solution

The invention thus relates to a process which is suitable for producing end-group-functionalized macromolecules whose degree of functionalization—that is the average number of functionalizations per macromolecule—is very close to 1. The process is also suitable for producing macromolecules having a very narrow polydispersity.

The process according to the invention is such a process for producing end-group-functionalized macromolecules—hereinafter according to the invention: oligomers—based on styrene by means of free-radical polymerization, starting from an amount of monomer comprising at least 90 mol % styrene, wherein the polymerization is started by self-initiation and is controlled by means of a difunctional regulator comprising the functional groups $R_{F1}$ and $R_{F2}$, where the group $R_{F1}$ is an unsubstituted sulfanyl group and where the group $R_{F2}$ of the regulator is selected from the group consisting of hydroxyl groups (—OH), carboxyl groups (—COOH), ester groups (—COOR), primary amino groups (—NH$_2$), secondary amines (—NHR), alkoxysilane groups (—Si(OR)$_3$)

wherein a regulator reference amount $R_B$ is defined such that the quantitative ratio of monomers in the amount of monomer to regulator molecules in the regulator reference amount is selected in the range from 100:20 to 100:0.5, characterized in that the total amount of monomer is initially charged, the batch with the monomer comprises not more than 10% by weight of a solvent, up to 5% by weight of the regulator reference amount is added to the amount of monomer prior to the start of the reaction, the temperature of the amount of monomer is controlled such that the polymerization starts by self-initiation, wherein the further addition of regulator to the polymerization reaction is carried out continuously or in discrete steps, until a polymerization conversion C(t) of at least 0.85 (=85%) is achieved, and in such a manner that at all times the following condition (I) is met:

$$C(t)-0.05 \leq X_{reg}(t) \leq C(t)+0.05 \qquad (I)$$

where

C(t)=polymerization conversion up to time point t
 $C(t)=n_{mon}(t)/n_{mon,tot}$
 $n_{mon}(t)$=total amount of reacted monomers in the course of the polymerization reaction up to the time point t
 $n_{mon,tot}$=amount of all monomers used $n_{mon,tot}$ (amount converted)
$X_{reg}(t)$=fractional amount of regulator $X_{reg}(t)=R(t)/R_B$
 R(t)=total amount of regulator added up to the time point (t)
 $R_B$=regulator reference amount In the macromolecule amount produced according to the invention, in the context of this document, oligomers are under discussion. In the present case, the term "oligomer" serves only as a linguistic boundary for those polymers with high average molecular weight; and in particular the term "oligomer" is to include polymers of up to a number-average molecular weight of up to 20 000 g/mol.

The monomer mixture—and the reactant mixture—refers to the monomer batch for the polymerization, i.e. the entirety of the monomers used.

The reaction batch or starting mixture refers to the mixture of starting materials (reactants) and possibly further components present before the start of the polymerization, such as, if appropriate, the presence of initiators, regulators, accelerators or the like, including possible solvent present.

The polymerization mixture refers to the mixture of starting materials (reactants), intermediates and end materials (products) of the polymerization located in the reactor at the respective time point t, and optionally further components present and optionally solvent present in the reactor.

The polymerization result is understood to mean the polymerization mixture after completion or after termination of the polymerization.

Exact amounts by number are understood to mean substance amounts.

In accordance with the inventive process, the process starts from a monomer mixture comprising 90 to 100 mol % styrene. If the monomer mixture is not composed exclusively of styrene monomers, such monomers can be selected as comonomers which do not interfere with or prevent a self-initiation of the polymerization. In particular, up to 10 mol % of other vinyl aromatic compounds can be selected as comonomers (i.e. those vinyl aromatic compounds which are not styrene, for example, styrene derivatives). Other suitable vinyl aromatic compounds are especially derivatives of styrene alkylated on the ring such as o-methylstyrene, m-methylstyrene, p-methylstyrene, 4-tert-butylstyrene, 2,4,6-trimethylstyrene, but also vinyl aromatic compounds such as 4-vinylanisole, 4-trifluoromethylstyrene, 4-vinylbiphenyl, 2-vinylnaphthalene, 9-vinylanthracene.

In a particularly preferred manner, a procedure is followed in which, apart from styrene and optionally other vinyl aromatic compounds, no further monomers are present in the amount of monomer; optionally in the presence of amounts of impurities insignificant for the invention.

The regulators used are at least difunctional regulators having at least the functional groups $R_{F1}$ and $R_{F2}$. In this case, the group $R_{F1}$ is an unsubstituted sulfanyl group and the group $R_{F2}$ of the regulator is selected from the group consisting of hydroxyl groups (—OH), carboxyl groups (—COOH), ester groups (—COOR), primary amino groups (—NH$_2$), secondary amines (—NHR), alkoxysilane groups (—Si(OR)$_3$). In this case, the unsubstituted sulfanyl group is employed for regulating the polymerization reaction, whereas the group $R_{F2}$ remains inert in the actual polymerization. If the group $R_{F2}$ is one that itself acts as a regulator or could lead to secondary reactions, it is protected with a protecting group prior to use of the regulator. In particular, if primary or secondary amines are selected as functional groups $R_{F2}$, these groups are very preferably used in protected form, i.e. the appropriate groups of the regulator are provided with a protecting group prior to their use.

A single regulator or a combination of two or more regulators of the type mentioned may be used, where in the case of more than one regulator, the total amount of regulator to be used mentioned above refers to the entirety of all regulators used of the type determined according to the invention.

The regulators selected can be for example—without being exhaustive—the following substances:

2-mercaptoethanol, 3-mercaptopropanol, 4-mercaptobutanol, 5-mercaptobutanol, 6-mercaptohexanol, 11-mercaptoundecanol, 16-mercaptohexadecanol, 1-mercapto-2-propanol, 3-mercapto-1-propanol, 3-mercapto-1-hexanol, 2-methyl-3-sulfanylpropionic acid, 4-mercaptobutyric acid, 6-mercaptohexanoic acid, 2-mercaptopropionic acid, 3-mercaptopropionic acid, mercaptoacetic acid, 11-mercaptoundecanoic acid, 16-mercaptohexadecanoic acid, 2-aminoethanethiol, 2-aminoethanethiol hydrochloride, 4-aminothiophenol, 3-mercaptopropyltriethoxysilane, 3-mercaptopropylmethyldimethoxysilane.

Particularly excellent regulators from the above list are 2-aminoethanethiol, 2-mercaptoethanol, 3-mercaptopropionic acid, 2-mercaptopropionic acid and 2-mercaptoacetic acid.

The polymerization is carried out such that
the total amount of monomer is initially charged,
the polymerization is started by self-initiation and is controlled by means of the difunctional regulator,
and the addition of regulator is at least for the most part carried out according to a prescribed program.

The totality of the monomers is initially charged for the polymerization, particularly advantageously in a starting mixture which is low in solvent, i.e. can comprise up to a maximum of 10% by weight of solvent, or particularly preferably is solvent-free.

In accordance with the invention, at least a portion of the amount of regulator is added according to a prescribed program. It has been found that the amount of regulator favorably selected for the process is dependent on the amount of monomers used and that the average molecular weight finally present of the oligomers obtained, i.e. their degree of polymerization, can be controlled by means of the amount of regulator selected. The pre-selected amount of regulator is referred to below as the regulator reference amount $R_B$. The regulator reference amount $R_B$ can be understood to mean the amount of regulator which would be considered as optimal for one hundred percent monomer conversion, in order to achieve a certain average molecular weight of the oligomers, without wishing this interpretation to be unnecessarily limiting.

In the process described here, the molar mass of the oligomers to be produced can therefore be influenced by the amount of thiol regulator used. A ratio of monomer to regulator of 5:1 leads to oligomers having an average molar mass of around $M_n$=1 000 g/mol. Using a ratio of 200:1, an average molar mass in the range of $M_n$=20 000 g/mol is attained.

The regulator reference amount $R_B$ is preferably selected such that the ratio of the amount of the monomers in the monomer mixture—that is the amount of the total monomers used—to the amount of regulator molecules in the regulator reference amount is in the range from 100:20 to 100:0.5 (i.e. in the range of 5:1 to 200:1). In a particularly preferred process regime, the amount of regulator is selected so that the quantitative ratio of monomers in the monomer mixture to regulator molecules of the regulator reference amount is from 100:10 to 100:0.5, and that therefore the monomers are present in a ten- to 200-fold excess, based on the regulator molecules of the regulator reference amount.

Before the start of the polymerization, regulator is very preferably already added to the starting mixture (referred to below as "amount of regulator initially used"), and in particular in an amount of up to 5 mol %, advantageously between 1 and 5 mol %, based on the regulator reference amount.

To start the polymerization, the temperature of the starting mixture is controlled such that the polymerization starts by self-initiation by the styrene. In a very preferred procedure, the polymerization mixture is heated for this purpose to a temperature of at least 100° C., preferably at least 120° C.

The free-radical polymerization is preferably conducted at temperatures in the range of 100° C. to 145° C., very preferably in the range of 120° C. to 145° C. In this temperature range, the self-initiation takes place, and it can be operated with a low solvent content, particularly solvent-free. Particularly at temperatures around 145° C., the process can be operated under reflux of the monomers. Polystyrene has a glass transition temperature of 100° C.; in the molar mass range of less than 20 000 g/mol, the glass transition temperature is below 100° C. The reaction temperatures of the process therefore allow a low solvent, in particular solvent-free, polymerization, since the monomer itself initially serves as solvent and, at high conversions, the polymer is still free-flowing above the glass temperature.

The process is therefore very preferably operated at a state above the flow temperature $T_f$ of the polymerization mixture, that is, in a state of sufficient fluidity in which the viscosity of the system is lowered at the selected temperature until a homogeneous processing can be carried out in the reactors even without the presence of solvents. A state of sufficient fluidity is understood in this case to mean in particular such a physical state of the polymer concerned in which it is at temperatures above the glass temperature $T_G$ of the polymer and above that of the temperature $T_{min}$, at which the internal damping, expressed by the loss factor tan δ, has a minimum in the elastomeric state; furthermore wherein tan δ is ≥1 (i.e. the viscous component is predominant) and wherein the viscosity, expressed by the complex viscosity coefficient $\eta^*$, is around $\eta^* \leq 12\,000$ Pas; preferably around $\eta^* \leq 10\,000$ Pas.

Data for the glass transition temperature $T_G$ refer to the glass transition temperature Tg (half of the change in specific heat capacity) which may be determined by means of differential scanning calorimetry according to DIN 53765: 1994-03, unless otherwise stated in individual cases.

The complex viscosity $\eta^*$ and the loss factor tan δ can be determined by Dynamic Mechanical Analysis (DMA), in particular according to DIN EN ISO 6721-2:2008-09; the figures in this document refer to the deformation-driven dynamic measurement of the non-crosslinked system in the linear viscosity range with an oscillation frequency of 10 rad/s and a deformation of 1%.

The preferred process regimes mentioned therefore offer the advantage that it is possible to dispense with solvent (i.e. to operate only in the presence of monomer and regulator) or to keep the amount of solvent low such that no specific concentration is required for a solvent-free system after the polymerization. The process is therefore very efficient and, based on the use of raw materials, a very cost-effective process.

After starting the polymerization reaction, further addition of the regulator to the polymerization reaction is carried out such that, to achieve up to at least a polymerization conversion of 85%, at all times the following condition (I) is met:

$$C(t)-0.05 \leq X_{reg}(t) \leq C(t)+0.05 \quad (I)$$

wherein
C(t)=polymerization conversion up to the time point t
$X_{reg}(t)$=fractional amount of regulator of the total amount of regulator R(t) added up to the time point (t), based on the regulator reference amount $R_B$ The polymerization conversion up to which the formula (I) should at least be satisfied, is referred to below for reference purposes as "minimum conversion $C_M$".

In the context of this document, conversion data are as usual based on the substance conversion, i.e. on the fraction of the total reacted molecules based on all molecules used (cf. corresponding definition in Rompp Online 2013; document identifier RD-21-00290).

The polymerization conversion reached C(t)—i.e. the polymerization conversion up to a time point t—is the fraction of the total amount of reacted monomers $n_{mon}(t)$ in the course of the polymerization reaction up to the time point t, based on the amount of all monomers used $n_{mon,tot}$ [$C(t)=n_{mon}(t) n_{mon,tot}$]. Therefore, the addition of regulator is controlled such that at each time point t, the value of the fractional amount of regulator added up to this time point is not more than about 0.05 (i.e. not more than about 5 percentage points) below and not more than about 0.05 (i.e. not more than about 5 percentage points) above the value of the respective polymerization conversion C(t) at this time point t.

The fractional amount of regulator $X_{Reg}(t)$ added at the time point t is the fraction of the total amount of regulator R(t) added up to the time point (t), based on the regulator reference amount $R_B$, as a figure in mole percent [$X_{Reg}(t)=R(t)/R_B$]. The total amount of regulator R(t) added up to a time point t—i.e. the total amount of regulator present in the polymerization mixture at the time point t—includes the amount of regulator initially used.

In a particularly preferred manner, a procedure is followed such that the addition of regulator up to the minimum conversion $C_M$ is controlled such that at each time point t, the value of the fractional amount of regulator added up to this time point is not more than about 0.02 (i.e. not more than about 2 percentage points) below and not more than about 0.02 (i.e. not more than about 2 percentage points) above the value of the respective polymerization conversion C(t) at this time point t; i.e.

$$C(t)-0.02 \leq X_{reg}(t) \leq C(t)+0.02 \quad (Ia)$$

The polydispersity can be thereby further reduced; the molar mass distribution is even narrower than in the case of a higher fractional amount of regulator.

It should be noted here that the amount of regulator already initially added (i.e. the amount of regulator already added before the start of the self-initiation) should not then be higher than 2% of the regulator reference amount, in particular, between 1% and 2% of the regulator reference amount.

The regulator can be added at regular or irregular intervals according to formulae (I) and (Ia), as long as the condition is met. Regular addition is, for example, the uninterrupted continuous inflow of the regulator at constant flow rate (in mol per unit time) or the repeated addition in discrete steps at constant amount of regulator per addition step and at constant time intervals (non-liquid regulators can be added dissolved in some solvent or better in molten form). The addition may however also be effected, for example, with varying flow rate (i.e. varying amount of regulator per unit time) or in discrete steps, in which the respective amount of regulator added and/or the time intervals between the addition steps are varied. The regulator still to be added is introduced during the polymerization, that is to say, depending on the progress of the polymerization. The addition is carried out in the relevant conversion window such that the amount of regulator added at each time point (t) of the formulae (I) or (Ia) is sufficient, as indicated above. For this purpose, the polymerization conversion is particularly preferably determined continuously or in repeated steps. The polymerization conversion can be monitored online. Online control of the polymerization conversion can take place by using near-infrared spectroscopy and is known; compare, for example "On-line Determination of the Conversion in a Styrene Bulk Polymerization Batch Reactor using Near-Infrared Spectroscopy"; Journal of Applied Polymer Science, Volume 84 (2002), Issue 1, pages 90-98; the method mentioned therein is advantageously applied to the process according to the invention. An overview of other methods for online determination of the polymerization conversion is to be found in "Recent Developments in Hardware Sensors for the On-Line Monitoring of Polymerization Reactions", J.M.S. —Rev. Macromol. Chem Phys., C39(1), 57-134 (1999).

The deviation of such on-line polymerization conversion determinations is in this case below 0.5%. The figures of formulae (I) and (Ia) here refer particularly to such a precision of 0.005.

Alternatively, the polymerization conversion can be determined by sampling at the relevant time points and analysis of the samples taken by known methods.

Since the addition of the regulator to maintain the aforementioned condition (I) or (Ia) does not proceed in one single step at the start of the reaction but by addition of portions of the regulator over time, it can be achieved that, rather than the regulator concentration in the polymerization mixture being very high at the start and then decreasing continuously, the regulator amount is low at the start of the reaction, but is maintained at a certain level in the polymerization solution as the polymerization stage progresses.

A very preferred method has been found when the addition of regulator is carried out continuously with variable adjustable flow of the regulator to the monomer during the course of the conversion.

A further preferred method has been found when identical amounts of regulator are added in each case in discrete addition mode after identical monomer consumption in each case (i.e. at identical variation of the polymerization conversion in each case). With particular preference, the addition of regulator is carried out continuously with a quantity-based constant flow of regulator.

Particularly good results are obtained with regard to a desired average molecular weight and a narrow polydispersity if the condition according to formula (I) or (Ia) is met up to a polymerization conversion, i.e. a minimum conversion $C_M$ for the application of formulae (I) or (Ia), of at least 90 mol %, better up to a polymerization conversion, i.e. a minimum conversion $C_M$, of at least 95 mol %, even better up to a polymerization conversion, i.e. a minimum conversion $C_M$, of at least 98 mol %, the addition of regulator thus being carried out also at high polymerization conversions in compliance with the condition according to formula (I) or (Ia).

The polymerization can be terminated on reaching the minimum conversion $C_M$ for the application of the formula (I) or (Ia), but it can still be further conducted advantageously up to higher polymerization conversions, even after reaching this minimum conversion $C_M$. It has been shown that excellent results are achieved when the regulator is added according to formula (I) until the polymerization has taken place up to the minimum conversion $C_M$ for the application of formula (I) (at least 85%, preferably 90%, more preferably 95%, especially preferably 98%; see above), even if there is deviation from the formula (I) or (Ia) during the addition of the residual amount of regulator after reaching the minimum conversion $C_M$—even if subsequently the remaining amount of regulator to be added, in deviation from formula (I) or (Ia) is no longer added (particularly in the case of already high polymerization conversions) or is added completely or partially, singly, continuously or periodically. Advantageously, at completion of the reaction, at least 90% of the regulator, based on the regulator reference amount, should have been added to the polymerization mixture, very preferably at least 99%. Advantageously, by the end of the polymerization, an amount of regulator equivalent to the regulator reference amount is added in total. A complete or substantially complete addition of regulator favors the precision of the target average molecular weight of the oligomers but on the other hand may lead to regulator residues in the oligomer in the case of incomplete reaction of the regulator.

The polymerization reaction can be terminated, for example, by lowering the temperature below the self-initiation temperature of styrene. Depending on the glass transition temperature of the oligomers obtained, which is sometimes only slightly below this self-initiation temperature, it can be advantageous here to discharge the polymerization mixture from the reactor beforehand while still in a free-flowing state so it does not become solidified in the reactor.

The oligomers obtainable by the process according to the invention may be used outstandingly as prepolymers for the synthesis of higher molecular weight polymers. Prepolymers are understood to mean in particular such precursors or intermediates of the polymer production which are still soluble and malleably processable.

It has been found, surprisingly, that initiation of the polymerization by a thermal self-initiation of styrene—particularly in consideration of the other process parameters—has distinct advantages with respect to the degree of functionalization of the functionalized oligomers. This degree of functionalization is between 1 and 1.2, i.e. each of the oligomers has on average 1 to 1.2 functional groups, wherein particularly advantageously at least 98%, preferably at least 99.5% of the chains bear at least one functional group.

It has been found that even somewhat better values could be achieved in oligomers having lower average molar masses than in the oligomers having somewhat higher average molecular weights. For instance, in oligomers having number-average molecular weights of not more than 20 000 g/mol, generally degrees of functionalization of not more than 1.2 could be achieved and in oligomers having number-average molecular weights of not more than 10 000 g/mol, generally even degrees of functionalization of not more than 1.1 could be achieved.

The degree of functionalization f is determined by a comparison of the average molar masses $M_n$ determined by two different methods. Firstly, the number-average molar mass $M_n$ is determined by gel permeation chromatography (GPC). The molar mass is then determined by an equivalence method. To determine the molar mass by means of an equivalence method, it is assumed that only one functional group is present per polymer chain. Firstly, $^1$H-NMR spectroscopy can be used. If the signals arising from the thiol end group are isolated from signals of the repeating units of the polymer, these can each be integrated in order to determine the molar mass $M_n$ therefrom. Secondly, the molar mass can be determined by titration of the end group. By means of the polymer weighed and the number of functional end groups determined, the average molar mass $M_n$ is determined.

Division of the two average molar masses $M_n$ determined gives the functionality f:

$$f = \frac{\text{Molar mass } Mn \text{ determined by } GPC}{\text{Molar mass } Mn \text{ determined by equivalence method}}$$

In polymerizations according to the prior art in which thermally cleavable polymerization initiators are used, such as azo compounds or peroxide compounds, the radical initiators which start the polymerization are formed before this results in transfer to the thiol. When using non-functional initiators such as azobis(isobutyronitrile) (AIBN), non-functionalized chains arise as by-product, whereby the degree of functionalization is reduced.

By using the functionalized initiators selected in the prior art, by contrast it is observed that the degree of functionalization tends towards 2.

In this process described, the functional regulator is added to the reaction during the polymerization. In this case up to 5 mol % of the regulator reference amount (up to 2 mol % on applying formula (Ia)) are added prior to the polymerization and the remaining amount is metered in to the reaction mixture during the polymerization.

If the addition of regulator is guided by the scope of formula (I), even better by the scope of formula (Ia), very narrow distribution oligomers can be obtained. Depending on the number-average molecular weight of the oligomers obtained, polydispersities (polydispersity D=weight-average molecular weight $M_w$/number-average molecular weight $M_n$) of less than 2.5 (particularly for oligomers having a number-average molecular weight of less than 20 000 g/mol), of less than 1.9 (particularly for oligomers having a number-average molecular weight of less than 10 000 g/mol) and even of less than 1.4 (particularly for oligomers having a number-average molecular weight of less than 1500 g/mol), can be obtained. Fluctuations in the metering in rates of the controlled addition lead to observation of substantial broadening of the molar mass distribution.

Unforeseeable to those skilled in the art, moreover, by the use of thermal self-initiation of styrene for the process according to the invention, it was possible to achieve that no competing by-products were found.

If this is required or desired, purification of the polymerization product can be carried out, particularly by removing unreacted monomers such as unreacted styrene or other vinyl aromatic compounds, for example, styrene derivatives, and/or intermediates and/or by-products and/or regulator residues from the polymerization product.

With the process according to the invention it has been possible to obtain well-defined oligomers which can be equipped with terminal functional groups at a narrow degree of functionalization. The terminal position of the groups $R_{F2}$ arises here via the growth of the oligomer chain on the regulator molecule provided with a radical function. In particular all functional groups which are located on the end component of the oligomer remaining from the regulator molecule are thus terminal in the sense of the present application. If the regulator molecule has a hydrocarbon chain as skeleton, wherein the functional group $R_{F2}$ is located on an end carbon atom, the functional group is also "absolutely" terminal in the oligomer, i.e. on an end carbon atom. As described above, the oligomers have in particular a well-defined molecular weight, a low polydispersity and a degree of functionality lying close to 1.

These terminal functionalized oligomers can be used outstandingly for this purpose, in order to introduce, via the group $R_{F2}$, other functions $R_{F4}$ at terminal positions in the oligomers, particularly those which, in the context of the polymerization—due in part to their high sensitivity or responsiveness—could not be introduced and/or not in sufficient quality and/or not with sufficient selectivity and/or not at a desired position into the oligomers, for example, because they would change their nature in the polymerization. A multiplicity of such functional groups, which can be introduced into the oligomers, is feasible. Such other functional groups $R_{F4}$ may be in particular, by way of example, carbon-carbon double bonds—also referred to below as olefinic double bonds.

In order to equip the oligomers obtained according to the invention with other functions $R_{F4}$—particularly with olefinic double bonds—, these are reacted with at least one compound Z in an advantageous further development of the process according to the invention in a subsequent process step, wherein the compound Z has at least one functional group $R_{F3}$ and at least one functional group $R_{F4}$—in particular an olefinic double bond. The reaction can be effected in particular by a coupling reaction such as an addition or substitution reaction. If the groups $R_{F2}$ (that is the groups located on the oligomer) are present in protected form, the protecting group is preferably firstly removed such that the coupling reaction may be carried out.

The coupling reaction may be carried out in particular by reaction of the—if appropriate, deprotected—functional group $R_{F2}$ with a functional group $R_{F3}$ of a compound Z, wherein the functional group $R_{F3}$ is selected such that it is exceptionally suitable for addition or substitution reactions with the functional group $R_{F2}$. The compound Z is selected such that it also has, in addition to the functional group $R_{F3}$, at least one functional group $R_{F4}$—in particular an olefinic unsaturated double bond, wherein at least that part of the compound Z comprising the functional group $R_{F4}$—in particular the olefinic double bond—is linked to the oligomers by the coupling reaction.

The compound Z is particularly preferably selected from the list consisting of acrylic acid, methacrylic acid, acrylic esters, methacrylic esters, acrylic anhydride, methacrylic anhydride, glycidyl acrylate, glycidyl methacrylate, maleic anhydride, acryloyl chloride, methacryloyl chloride, 2-isocyanatoethyl acrylate, 2-isocyanatoethyl methacrylate, 4-chloromethylstyrene, itaconic anhydride, 3,4-epoxycyclohexylmethyl acrylate and epoxycyclohexylmethyl methacrylate.

If the compound Z has a hydrocarbon chain as skeleton and the functional group $R_{F4}$ is located on an end carbon atom of this hydrocarbon chain—the group $R_{F4}$ being in particular an olefinic double bond adjacent to an end carbon atom—, the functional group $R_{F4}$ is present at an end carbon atom of the (thus modified) refunctionalized oligomer even after the introduction into the oligomer.

In a preferred procedure, the reaction of the group $R_{F2}$ with the functional group $R_{F3}$ is carried out at a temperature of at least 100° C. Particular preference is given to proceeding such that the reaction of the group $R_{F2}$ with the functional group $R_{F3}$ is carried out in the same reactor in which the polymerization has already been carried out.

If this is required or desired, the reaction product can be purified.

Macromolecules that have been functionalized with a double bond are of interest as comonomers—also referred to as "macromonomers". These may serve in turn as monomers in polymerization reactions. In this manner, for example, block copolymers can be produced. In a simple manner, comb polymers are thus also obtainable.

By means of conventional polymerization, in particular such macromolecules equipped with terminal olefinic double bonds, i.e. with a double bond between the last and penultimate carbon atom of the respective molecule chain, cannot be satisfactorily obtained since the double bonds react in the scope of the polymerization and therefore no terminal double bonds could be incorporated specifically in the resulting macromolecule. It is difficult, furthermore, to produce the macromolecules such that their functionality tends towards 1—that is on average one double bond is present per macromolecule—and that they have a narrow size distribution, i.e. a low polydispersity. Narrow size distribution macromolecules are then particularly useful if all side chains of the comb polymers should have substantially the same length.

Macromolecules which meet the abovementioned requirements can be obtained by the process according to the invention. The invention therefore relates to oligomers which are obtainable by the process according to the invention. These include in particular end-group-functionalized oligomers, particularly those which are presented in the context of this document, very particularly refunctionalized oligomers which are obtained by further reaction of the oligomers obtained with at least one compound Z, particularly those which each bear a terminal olefinic double bond.

The oligomers according to the invention are in particular those, based on polystyrene, which have a number-average molecular weight in the range of 1000 g/mol to 20 000 g/mol, particularly to 10 000 g/mol, and/or whose polydispersity is not greater than 2.5, preferably not greater than 2.0, very preferably not greater than 1.5, and/or which have a degree of functionalization from 1 to 1.2, wherein particularly advantageously at least 98%, preferably at least 99.5% of the chains bear at least one functional group.

The following oligomers are explicitly mentioned:
- those having a number-average molecular weight between 1000 g/mol and 20 000 g/mol and a polydispersity of not more than 2.5 and a degree of functionalization between 1 and 1.2, wherein at least 98% of the chains bear at least one functional group,
- those having a number-average molecular weight between 1000 g/mol and 10 000 g/mol and a polydispersity of not more than 2.5 and a degree of functionalization between 1 and 1.2, wherein at least 98% of the chains bear at least one functional group,
- those refunctionalized oligomers having a number-average molecular weight between 1000 g/mol and 20 000 g/mol and a polydispersity of not more than 2.5 and a degree of functionalization between 1 and 1.2, wherein at least 98% of the chains bear at least one terminal double bond as functional group.

EXAMPLES

The invention will be illustrated in detail below by means of examples. In addition to the test methods already described above, the following methods are used:

Methods

Molar mass determination was carried out by means of gel permeation chromatography using THF (HPLC Grade, non-stabilized—Biosolve cat. No. 202220602) as eluent, at room temperature and at a flow rate of 1 ml/min. The GPC system consists of a pump from FLOW, Modell Intelligent Pump AL-12, a sampling device from Schambeck SFD, Modell S5200, and a column combination from MZ Analysentechnik GmbH. A degasser from Schambeck of the type Gastorr BG 12 is connected upstream of the pump. The column combination consists of a precolumn of porosity 100 Å and also three main columns having porosities of 10 000, 1000 and 100 Å and including a styrene-divinylbenzene copolymer (type Gel Sd plus). The detectors were a Waters 486 Turnable Absorbance Detector and a Schambeck SFD RI 2000 Differential Refractometer, which are connected in series. Polystyrene standards in the range of 575 to 3 114 000 g/mol were used for calibration. Toluene is added to the samples as internal standard.

300 MHz $^1$H-NMR spectroscopic measurements were recorded using a Bruker Advance DRX 300 NMR spectrometer at room temperature.

Example 1

Starting Compounds and Amounts

|  | Monomer Styrene | Regulator 2-Mercaptoethanol |
|---|---|---|
| Amount | 200 g (1.92 mol) | 3 g (0.038 mol) |
| Molar ratio | 50 | 1 |

Styrene and 2-mercaptoethanol are used in a molar ratio of 50:1. 200 g of styrene and 3 mol % of regulator are initially charged in a 500 ml laboratory reactor and the reactor is inertized with nitrogen. The reaction mixture is heated to an internal temperature of 145° C. up to reflux of the monomer and maintained at this temperature throughout the entire reaction. The styrene conversion is checked throughout the whole reaction. 2-Mercaptoethanol is added continuously, wherein the percentage total molar amount of regulator added does not deviate by more than 5% of the percentage total molar conversion of the monomer. The polymerization is conducted until monomer conversion reaches 97%.

A prepolymer is obtained having a molar mass of $M_n$=5030 g/mol where $M_w/M_n$=1.7. The functionality is 1.04.

Example 2

Starting Compounds and Amounts

|  | Monomer Styrene | Regulator 2-Mercaptoethanol |
|---|---|---|
| Amount | 200 g (1.92 mol) | 0.75 g (0.0096 mol) |
| Molar ratio | 200 | 1 |

The procedure is conducted analogously to Example 1. The amounts used are 200 g of styrene and 0.75 g of 2-mercaptoethanol.

A prepolymer is obtained having a molar mass of Mn=19 960 g/mol where Mw/Mn=2.48. The functionality is 1.18.

Example 3

The prepolymer prepared from Example 1 is dissolved in 500 g of ethyl acetate and heated to 75° C. The solution is then treated with 10 g of isocyanatoethyl methacrylate and stirred for 24 hours. The polymer is then precipitated in 5 L of methanol, filtered off and dried under vacuum. A refunctionalized oligomer is obtained, namely a polymerizable polystyrene macromonomer having a methacrylic end group.

Example 4 (Comparative Example)

As described in JP 1064705A, a laboratory reactor was equipped with two dropping funnels, reflux condenser and anchor stirrer. As precharge, 500 parts of styrene and 300 parts of methyl isobutyl ketone (MIBK) were filled into the reactor. A further 500 parts of styrene were filled in one dropping funnel (dropping funnel 1) and 12.5 parts of AIBN, 21.2 parts of mercaptopropionic acid and a further 250 parts of MIBK in the other dropping funnel (dropping funnel 2).

After inertizing with nitrogen, the solution was heated in the reactor to 90° C. The contents of dropping funnel 1 were added dropwise over 4 hours and the contents of dropping funnel 2 were added dropwise over 10 hours into the reactor. After a further 2 hours, the reaction was terminated by cooling to room temperature.

The conversion of styrene was 88%. The resulting polymer had a molar mass of $M_n$=8 300 g/mol with $M_w/M_n$=2.8. The functionality is only 0.7.

Comparison of Examples 1 and 4 shows that the oligomer produced by the process according to the invention at comparable molar mass has a distinctly low dispersity and a much improved functionality close to 1.

Example 2 in comparison with Example 1 shows the effect of a change to the ratio of the starting monomer to regulator. If a lower ratio of monomer to regulator is used, oligomers are obtained of greater molar mass at higher dispersity.

The invention claimed is:

1. A process for producing end-group-functionalized oligomers based on styrene by means of free-radical polymerization, starting from an amount of monomer comprising at least 90 mol % styrene, wherein
   the polymerization is started by self-initiation
   and is controlled by means of a difunctional regulator comprising the functional groups $R_{F1}$ and $R_{F2}$, where the group $R_{F1}$ is an unsubstituted sulfanyl group and where the group $R_{F2}$ of the regulator is selected from the group consisting of hydroxyl groups (—OH), carboxyl groups (—COOH), ester groups (—COOR), primary amino groups (—NH$_2$), secondary amines (—NHR),
   wherein the molar ratio of the total monomers used to the regulator is from 5:1 to 200:1
wherein
   the total amount of monomer is initially charged,
   the batch with the monomer comprises not more than 10% by weight of a solvent,
   up to 5% by weight of the total amount of regulator is added to the amount of monomer prior to the start of the reaction,
   the temperature of the amount of monomer is controlled such that the polymerization starts by self-initiation, and
   the further addition of regulator to the polymerization reaction is carried out continuously or in discrete steps, until a polymerization conversion of at least 85% is achieved, and in such a manner that at all times the following condition (I) is met:

$$C(t)-0.05 \leq X_{reg}(t) \leq C(t)+0.05 \quad (I)$$

wherein
   C(t)=polymerization conversion up to the time point t
   C(t)=$n_{mon}(t)/n_{mon,tot}$
   $n_{mon}(t)$=total amount of reacted monomers in the course of the polymerization reaction up to the time point t
   $n_{mon,tot}$=amount of all monomers used $n_{mon,tot}$ (amount converted)
   $X_{reg}(t)$=fractional amount of regulator $X_{reg}(t)$=R(t)/$R_B$
   R(t)=total amount of regulator added up to the time point (t)
   $R_B$=total amount of regulator.

2. The process as claimed in claim 1, wherein condition (I) is met up to a polymerization conversion of at least 90%.

3. The process as claimed in claim 1, wherein a still remaining, previously unadded amount of regulator is added continuously or periodically.

4. The process as claimed in claim 1, wherein the amount of monomer, in addition to styrene, comprises up to 10 mol % of other vinyl aromatic compounds.

5. The process as claimed in claim 1, wherein, apart from styrene and optionally other vinyl aromatic compounds, no further monomers are present in the amount of monomer.

6. The process as claimed in claim 1, wherein the polymerization is carried out at a temperature of at least 100° C.

7. The process as claimed in claim 1, wherein the polymerization is carried out free of solvent.

8. The process as claimed in claim 1, wherein the molar ratio of the total monomers used to the regulator is from 10:1 to 200:1.

9. The process as claimed in claim 1, wherein the regulator is selected from the group consisting of 2-aminoethanethiol, 2-mercaptoethanol, 3-mercaptopropionic acid, 2-mercaptopropionic acid and 2-mercaptoacetic acid, and combinations thereof.

10. The process as claimed in claim 1, wherein the number-average molecular weight of the resulting oligomers is in the range of 1000 g/mol to 20 000 g/mol.

11. The process as claimed in claim 1, wherein the polydispersity of the resulting polymers is not greater than 2.5.

12. The process as claimed in claim 1, wherein the polymerization product is purified by removing unreacted monomers and/or by-products from the polymerization product.

13. The process as claimed in claim 1, wherein
   in a subsequent process step, the oligomers obtained by the process of claim 1 are reacted with at least one compound Z having a functional group $R_{F3}$ and an olefinic double bond to give a refunctionalized oligomer,
   wherein at least that part of the compound Z comprising the olefinic double bond is linked to the oligomers by reaction of the functional group $R_{F2}$ with the functional group $R_{F3}$.

14. The process as claimed in claim 13, wherein the reaction of the group $R_{F2}$ with the functional group $R_{F3}$ is a substitution reaction.

15. The process as claimed in claim 13 wherein the reaction of the group $R_{F2}$ with the functional group $R_{F3}$ is carried out at a temperature of at least 100° C.

16. The process as claimed in claim 13, wherein the polymerization and the reaction of the group $R_{F2}$ with the functional group $R_{F3}$ are carried out in the same reactor.

17. The process as claimed in claim 13, wherein the compound Z having the functional group $R_{F3}$ and an olefinic double bond is selected from the group consisting of acrylic acid, methacrylic acid, acrylic esters, methacrylic esters, acrylic anhydride, methacrylic anhydride, glycidyl acrylate, glycidyl methacrylate, maleic anhydride, acryloyl chloride, methacryloyl chloride, 2-isocyanatoethyl acrylate, 2-isocyanatoethyl methacrylate, 4-chloromethylstyrene, itaconic anhydride, 3,4-epoxycyclohexylmethyl acrylate, and epoxycyclohexylmethyl methacrylate.

18. The process as claimed in claim 13, wherein the resulting refunctionalized oligomers have on average 0.95 to 1.05 olefinic double bonds introduced by the compound Z.

19. A refunctionalized oligomer obtained by the process of claim 13.

* * * * *